United States Patent
Fernández Peruchena et al.

(10) Patent No.: US 11,971,302 B2
(45) Date of Patent: Apr. 30, 2024

(54) SYSTEM FOR THE REAL-TIME HIGH PRECISION MEASUREMENT OF THE ATMOSPHERIC ATTENUATION OF ELECTROMAGNETIC RADIATION FROM AT LEAST ONE SOURCE AND METHOD FOR MEASUREMENT

(71) Applicant: FUNDACIÓN CENER-CIEMAT, Sarriguren (ES)

(72) Inventors: Carlos Fernández Peruchena, Navarra (ES); Ana Bernardos García, Navarra (ES); Marcelino Sánchez González, Navarra (ES); Carlos Heras Vila, Saragossa (ES); Iñigo Salina Áriz, Saragossa (ES); Rafael Alonso Esteban, Saragossa (ES)

(73) Assignee: FUNDACIÓN CENER-CIEMAT, Sarriguren (ES)

( * ) Notice: Subject to any disclaimer, the term of this patent is extended or adjusted under 35 U.S.C. 154(b) by 612 days.

(21) Appl. No.: 17/262,348

(22) PCT Filed: Jul. 25, 2019

(86) PCT No.: PCT/ES2019/070522
§ 371 (c)(1),
(2) Date: Jan. 22, 2021

(87) PCT Pub. No.: WO2020/021146
PCT Pub. Date: Jan. 30, 2020

(65) Prior Publication Data
US 2021/0223101 A1    Jul. 22, 2021

(30) Foreign Application Priority Data
Jul. 25, 2018   (ES) .................. ES201830758

(51) Int. Cl.
*G01J 3/28*   (2006.01)
*F24S 90/00*   (2018.01)
(Continued)

(52) U.S. Cl.
CPC ............ *G01J 3/2803* (2013.01); *F24S 90/00* (2018.05); *G01J 3/0218* (2013.01); *G01J 3/42* (2013.01); *F24S 2201/00* (2018.05)

(58) Field of Classification Search
CPC .... G01J 1/42; G01J 1/0411; G01J 3/42; G01J 3/0218; G01J 3/2803; G01J 2001/4266;
(Continued)

(56) References Cited

U.S. PATENT DOCUMENTS 6,373,558 B1 *  4/2002  Hasson .................. G01C 3/08
250/342

OTHER PUBLICATIONS

J. Ballestrin et al., "Solar extinction measurement system based on digital cameras. Application to solar tower plants", Renewable Energy, 2018, pp. 648-654, vol. 125.
(Continued)

*Primary Examiner* — John H Le
(74) *Attorney, Agent, or Firm* — Sughrue Mion, PLLC (57) ABSTRACT

A system for measurement of monochromatic attenuation for each wavelength of the spectrum, understood as such the attenuation at a wavelength of the spectrum with the spectral width provided by the measurement equipment, of the spectral attenuation in the spectral range of measurement, understood as such the set of monochromatic attenuations at all the wavelengths throughout the spectral range of measurement, and the total attenuation, understood as such the attenuation calculated by the integration of the spectral attenuation in the spectral range of measurement weighted with the solar spectrum. A method for measurement, providing measurement of attenuation in the entire spectral
(Continued)

range for the best energy system efficiency evaluation and for achieving a differential measurement of meteorological phenomena causing the attenuation, providing relevant information for the meteorological forecast in this specific field, which can be used for evaluating the attenuation phenomenon for solar plants site selection and for operating plants.

10 Claims, 4 Drawing Sheets

(51) Int. Cl.
     *G01J 3/02*         (2006.01)
     *G01J 3/42*         (2006.01)

(58) Field of Classification Search
     CPC ........ F24S 50/80; F24S 90/00; F24S 2201/00; F24S 20/20; Y02A 30/00; Y02E 10/40; Y02E 10/50
     USPC ............................................................ 702/3
     See application file for complete search history.

(56) References Cited

OTHER PUBLICATIONS

N. Hanrieder et al., "Atmospheric extinction in solar tower plants—A review", Solar Energy, 2017, pp. 193-207, vol. 152.
International Search Report for PCT/ES2019/070522 dated Jan. 13, 2020. [PCT/ISA/210].

* cited by examiner

SYSTEM FOR THE REAL-TIME HIGH PRECISION MEASUREMENT OF THE ATMOSPHERIC ATTENUATION OF ELECTROMAGNETIC RADIATION FROM AT LEAST ONE SOURCE AND METHOD FOR MEASUREMENT

CROSS REFERENCE TO RELATED APPLICATIONS

This application is a National Stage of International Application No. PCT/ES2019/070522 filed Jul. 25, 2019, claiming priority based on Spanish Patent Application No. P201830758 filed Jul. 25, 2018.

OBJECT OF THE INVENTION

The present invention, a system for the real-time high precision measurement of the atmospheric attenuation of electromagnetic radiation of solar rays at the terrestrial level of at least one source, relates to a system for the measurement of monochromatic attenuation for each wavelength of the spectrum, spectral attenuation in a espectral range of measurement, and total attenuation. The invention also relates to a method for measurement. Both the system and the methodology have been developed in order to achieve the highest level of accuracy in the final measurements. This invention introduces relevant technical improvements beyond the current state of the art.

The invention provides a measurement of the attenuation in the entire solar spectral range for the best energy system efficiency evaluation and for achieving a differential measurement of the meteorological phenomena causing said attenuation, thus providing relevant information for the meteorological forecast in this specific field.

The invention is comprised in the sector of energy generation by the capture of solar energy.

DESCRIPTION OF THE STATE OF THE ART

The efficiency of the central receiver solar power plants is affected by the optical efficiency of the set of collector elements, heliostats, and the subsequent atmospheric attenuation of the solar rays reflected by said collectors to the receiver element. This is a remarkable phenomenon influencing the performance of the plants, especially in low visibility days, in which the concentration content of aerosols and gases present in the Earth's atmosphere is higher.

The atmospheric attenuation of solar rays reflected by the collector elements on their path towards the receiver element is due to the phenomena of scattering (or diffusion) and the absorption of electromagnetic waves when they go through the atmosphere at the terrestrial level. Both scattering, i.e. the change in direction of the wave, and the energy absorption phenomenon, are due to interaction with the particles and aerosols suspended in the atmosphere, as well as gases dissolved therein. This attenuation is a function of the type and number of molecules present in the path of the solar rays.

The primary attenuating element in the path of said rays are aerosols, small particles (solids or liquids) in suspension. They are difficult to model and predict, and come from a wide range of sources (such as dust in suspension, sand storms, urban and industrial pollution, sea mists, etc.). The dominant attenuating phenomenon in the case of aerosols is scattering, which exhibit a strong spectral dependence according to their size distribution (Shaw, G. E., Reagan, J. A., & Herman, B. M. (1973). Investigations of atmospheric extinction using direct solar radiation measurements made with a multiple wavelength radiometer. Journal of Applied Meteorology, 12(2), 374-380). Moreover, the atmospheric gases present in the path of said rays cause both scattering and absorption (water vapor, ozone, NO 2 and other gases), and in this case the most important attenuating phenomenon is absorption. There are also spectral bands associated with the various atmospheric gases where absorption is most significant.

Therefore, it should be pointed out that the atmospheric air mass, including its particles in suspension, present in the distance traveled by the solar rays reflected by the collector elements on their path towards the receiver element constitutes a spectral filter which may vary throughout the day, depending on the variation of aerosols, the chemical composition of the air, and even meteorological parameters (Rahoma, U. A., & Hassan, A. H. (2012). Determination of atmospheric turbidity and its correlation with climatologically parameters. *Am. J. Environ. Sci,* 8, 597-604; and Wen, C. C., & Yeh, H. H. (2010). Comparative influences of airborne pollutants and meteorological parameters on atmospheric visibility and turbidity. Atmospheric Research, 96(4), 496-509). Likewise, the Earth's atmosphere also constitutes a variable spectral filter of solar radiation coming from the sun, which depends both on its composition (primarily aerosols and water vapor) and on the lengths the radiation travels through said atmosphere (which depends both on the time of year and on the time of day), which causes the solar radiation spectrum reaching the ground to be variable throughout the year, and even throughout the day (Iqbal, M. (2012). *An introduction to solar radiation. Elsevier*).

Therefore, is necessary a spectral analysis of the phenomenon of attenuation of solar radiation at the terrestrial level for its suitable characterization and modeling depending on the atmospheric components (including aerosols) at the terrestrial level. In other words, a simultaneous measurement of the spectral atmospheric attenuation of the reflected rays as well as other meteorological variables will allow us to model said attenuation depending on common variables in meteorology. Likewise, said modeling allows estimating the attenuation for different locations based on the historical logs of said meteorological values and making a better selection of the location of solar power plants.

Figure 1:
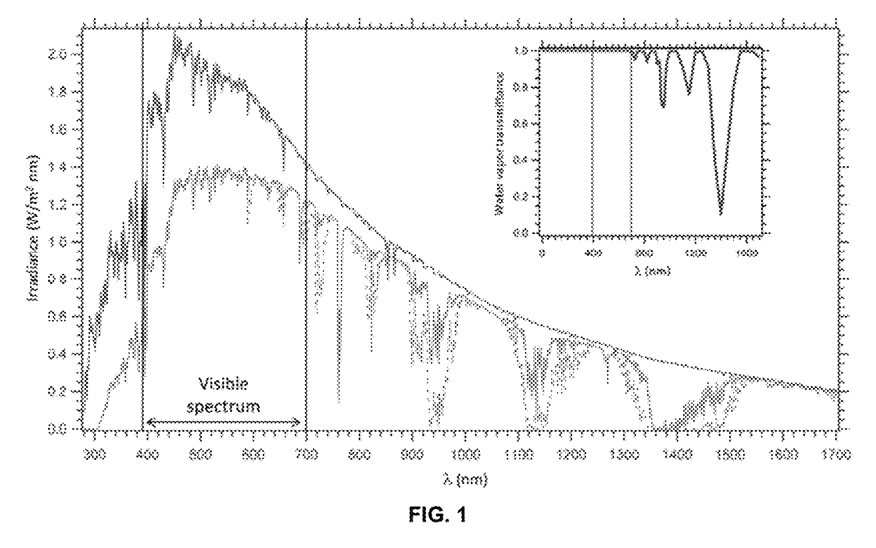
FIG. 1 shows an extraterrestrial solar radiation spectrum (top curve) along with spectra at the terrestrial level for various concentrations of atmospheric water vapor. It also shows the water vapor transmittance in the upper right-hand part.

It should be pointed out that all phenomena causing atmospheric attenuation produce differential variations of solar radiation throughout its spectral range, by varying the form in a specific and singular manner, which finally affects the variation of its integrated intensity. Thus, for example, water vapor has specific absorption bands in the infrared region (940, 1100, 1380 and 1870 nm, among others), whereas the scattering produced by particles has a greater effect in the ultraviolet and visible region of the spectrum. FIG. 1 shows the extraterrestrial solar irradiance spectrum (top curve, solid line) along with two direct normal radiation spectra at the terrestrial level, at both a low (middle curve, solid line) and a high (bottom curve, dotted line) concentration of atmospheric water vapor. FIG. 1 in turn shows a graph with the spectral water vapor transmittance.

Therefore, the measurement of the differential atmospheric attenuation at each wavelength allows distinguishing the different physical phenomena causing it, as well as quantifying each of them, which ultimately has a very significant effect on one hand on the precise measurement of total atmospheric attenuation, but also the prediction thereof based on the available information about the various atmospheric and meteorological phenomena.

Today there are no known systems for the spectral measurement of monochromatic atmospheric attenuation at the terrestrial level, which limits the final precision attainable in the measurement and/or estimation of total atmospheric attenuation, as well as the quantification thereof from other meteorological variables.

In the state of the art, there are experimental proposals for the measurement of total attenuation, i.e., without taking the frequency within the spectrum into account. One of these proposals is based on the use of a heliostat, a collector used in plants with central technology, and various aligned pyrheliometers for the purpose of measuring direct radiation coming from the sun and reflected by the heliostat at different positions (Goebel O. Luque F., Alobaidli Salbidoigeta I. 2011. Beam attenuation test for central power plants in high density aerosols atmosphere. setup methodology. Solarpaces Granada Spain; and Tahboub Z. Al Alobaidli A. Luque F, Salbidoigeta I., Farges O., Hassar X., Oumbe A., Geuder N., Goebel O., 2012. Solar beam attenuation experiments in Abu Dhabi, Solar Marrakech, Morocco). By means of this system based on the difference of the radiation measurement in the different pyrheliometers, the measurement of total terrestrial, but not spectral solar attenuation differs. Furthermore, this experience has been shown to present major uncertainties due fundamentally to the precision of the pyrheliometers, as well as uncertainty in the geometry of the heliostat and in the ray tracing used.

There are also other proposals based on the use of digital cameras (Ballestrin J., Monterreal R., Carra M. Fernandez-Reche J., Barbero J., Marzo A., 2016. Measurement on solar extinction in tower plants with digital cameras. *AIP Conference Proceedings* 1734, 13002), specifically on taking simultaneous photographs with digital cameras of a screen at different distances. In this sense, said measurement is not spectral, and furthermore it does not have the systems for the selective sensing of radiation proposed in the present invention, which renders limited precision of said system. Specifically, this paper quantifies and limits the measurement capacity of the equipment to an area where about only about 73% of the extinction occurs. The optic used by the digital camera, a zoom lens, is limited in several aspects with respect to the optic used in the present invention since it limits the available power in the measurement, hindering the monochromatic spectral measurement. The digital camera zoom lenses use lens systems with long focal lengths, up to 1000 mm, for performing the capture of images of faraway objects by means of integrated radiation measurements of the optical spectrum in which luminosity is not a limiting factor. These systems present a luminosity limitation rendering them unsuitable for monochromatic spectral measurement, which requires at least one order of magnitude more than that provided by this system to reach the desired precision. In addition to the luminosity limitation, another limitation is the size of the image these zoom lenses use since they form the image directly on the CCD (Charge Coupled Device) sensor of the camera, an image of several millimeters which would cause losses of signal strength by coupling an array spectrometer to the zoom lens, which limits its precision.

Therefore, the following problems are identified in the solutions of the state of the art:

At distances of more than about 800 meters, it is possible for the captured light to not come exclusively from the useful source, the light of which source is to be measured, so the use of a telescopic system is proposed.

There is chromatic aberration in the measurements of those systems using lenses, and therefore it cannot be assured that all the wavelengths are imaged on the same image plane.

The measurement does not take into account the difference existing between the light reflected by the useful source and the diffuse light reflected by the atmosphere between said source and the system for measurement.

The measurement does not include the entire spectral range of the sun, preferably between 300 nm and 1650 nm, i.e., the visible range and the near infrared range, such that significant errors occur by having to assume that the spectral form of the atmospheric attenuation of the infrared range (not measured by known systems) based on the atmospheric attenuation in the visible range.

There are errors in the measurement derived from the fact that the response of the measurement sensors are wavelength-dependent, and therefore grant a different weight to the various spectral components of light; and None of the systems of the state of the art performs a study and diagnostics of the cause of atmospheric attenuation.

None of the systems of the state of the art takes measurements of monochromatic atmospheric attenuation, spectral attenuation, and total attenuation in a differential manner.

In view of the foregoing, the present invention proposes a system and method for the measurement of spectral atmospheric attenuation which allow obtaining higher precision in the measurement of said attenuation.

DESCRIPTION OF THE INVENTION

The present invention, i.e. a system for the real-time measurement of the atmospheric attenuation of electromagnetic radiation from at least one source, has as a first object a system as described herein. Said system serves to characterize in real-time the causes of the atmospheric attenuation of electromagnetic radiation in the solar spectrum by the spectral measurement of the solar radiation at the terrestrial level. Specifically, it relates to a system for the best accurate measurement of:

the monochromatic attenuation for each wavelength of the spectrum, being understood as such the attenuation at a wavelength of the spectrum with the spectral width provided by the measurement equipment, the spectral attenuation in the spectral range of measurement, being understood as such the set of monochromatic attenuations at all the wavelengths throughout the spectral range of measurement, and the total attenuation, being understood as such the attenuation calculated by the integration of the spectral attenuation in the spectral range of measurement weighted with the solar spectrum.

The system is based on the separate arrangement of at least two light sensing devices, associated with measurement devices, and aligned with a light source or useful source, to infer the attenuation of the solar energy in the distance separating said light sensing devices by means of the real-time difference of the spectral energy striking them.

Specifically, the system object of the invention for the real-time measurement of the atmospheric attenuation of electromagnetic radiation from at least one source, preferably a hemispherical reflectance screen to reflect the incident solar radiation, and having at least the following elements:

at least two telescopic optical devices for the capture of a beam of the radiation from only said useful source and located at different distances from said source, which assure that only the radiation coming from the light source is captured, at least one real-time detection and measurement device, preferably a photodiode array spectrometer, optically connected, preferably by optical fiber, to each of the telescopic optical devices to provide simultaneous monochromatic spectral measurements of the radiation at least in the spectral range comprised between 300 nm and 1650 nm, including the ultraviolet, visible, and infrared ranges, at least one processor for taking measurements from the signals detected by the detection and measurement devices and associated with these devices, at least one general processor for communication between the detection and measurement devices based on the data of each processor from each detection and measurement device for, from the recorded information and by comparing said information in real-time, calculating the monochromatic attenuation, spectral attenuation, and global attenuation values, at least one system for alignment of the telescopic device with the source, preferably by displaying the image captured by means of a digital camera (preferably CCD).

A telescope is an optical system with a long focal length built by means of mirrors, when the application requires quality measurements under low luminosity conditions (as occurs in astronomical applications), or by lenses under high luminosity conditions. The telescope includes two main optical elements, an objective and an eyepiece. A mirror objective is not limited in size (like objective lenses), which allows increasing the available radiation in the measurement. The eyepiece allows both arranging a collimated ray beam and forming small images.

In the case of the present patent, the use of a reflecting telescope system, made up of the objective, eyepiece, and diaphragm located between both, allows:

splitting the beam after the eyepiece to take one part to the array spectrometer and another part to the sensor of the camera, to enable assuring that only the radiation coming from the screen is being measured, controlling the inlet aperture of the system to assure that only radiation coming from the screen enters the spectrometer, having sufficient radiation for the monochromatic spectral measurement since the telescope system allows increasing the captured radiation.

After the first split, the part of beam taken to the array spectrum is split, in turn, into as many beams as there are detection and measurement devices associated with each optical device, such that the split beams are guided to and focused on said measurement devices, each measurement device covering a different region of the spectral range to be measured. The connection between the optical device and the measurement device(s) is preferably performed by optical fiber. This splitting can be done either by optical beam splitters or by multifibers, a cable of two or more optical fibers at the light inlet end of which all the fibers are together such that each fiber collects part of the light beam and at the other end of which each fiber is separate and allows taking part of its guided light to different points being understood as multifibers. Likewise, the measurement devices can be photodiode array spectrometers or monochromators.

A second object of the invention is a method for the real-time measurement of the atmospheric attenuation of electromagnetic radiation from a source with a system like the one described above. Particularly, the method for measurement comprises the following steps:

a) aligning at least two telescopic optical devices, located at different distances from the source, towards the source of electromagnetic radiation, b) capturing a beam of electromagnetic radiation coming from the source by means of each of the telescopic optical devices, c) detecting and taking monochromatic measurements in the various spectral regions covered by the detection devices and taking the measurement of the captured radiation, and d) calculating in real-time the monochromatic atmospheric attenuation, spectral attenuation, and total attenuation by comparing monochromatic spectral measurements.

The method contemplates the option of, before aligning the devices towards the useful source of electromagnetic radiation, said devices being aligned with a black target or absorbing screen to measure the background light and subsequently consider excluding the background light from the measurement of the attenuation, such that all the light that is scattered on the path going from the screen to the optical device and does not come from the beam traveling from the screen to said device (which is to be measured) does not affect the final measurement.

Moreover, the methods allow, after the calculation of the atmospheric attenuation, applying spectroscopic techniques and a spectral analysis, to identify and discern the phenomena causing the previously calculated atmospheric attenuation.

Likewise, to perform calibration of the system for measurement, before aligning the telescopic optical devices it is convenient to carry out a process for calibrating the detection and measurement devices by locating the telescopic optical devices at the same distance from the source of electromagnetic radiation.

Using the system and method object of the present invention, precision of the measurements of the attenuation is increased with respect to the systems of the state of the art.

The invention allows capturing the light coming from the useful source, with an angle of acceptance (maximum angle in which the incident light ray is captured and measured by the measurement device) in the order of 1 to 3 mrad to assure that at a distance of 1 km only light coming from said source of the system is captured. This is because the telescopic optical device comprises an optical system acting as an objective with a long focal length and a very small inlet diaphragm, such that the angle of acceptance of the optical system (defined as the ratio between the inlet diaphragm and the focal length of the objective) is very small, in the order of 1 mrad. Therefore, a telescopic optical device arranged at a distance of 1 km from the useful source only captures the light reflected by an object of a size of 1 meter [1mradx1 km=1 m]. If the angle of acceptance is not limited, the system would capture light coming from outside the useful source of the system, which can lead to measurement errors. In the case of systems of the state of the art using cameras as sensors, these limit the angle of acceptance with the pixels of the camera that they use for calculating the light power. This leads to problems if there is chromatic aberration, since each wavelength can to be taken to different pixels of the digital camera.

In order to guarantee the highest accuracy of the measurement, the system object of the invention is preferably based on reflectors as optical imaging elements to assure that no there is chromatic aberration and therefore assure that all the wavelengths are imaged on the same plane image. By using reflectors or mirrors, (as optical elements), the chromatic aberration problem does not occur. Chromatic aberration can lead to errors in the case of the use of digital cameras as sensors, since each wavelength can be imaged in different pixels of the camera, so there will be pixels in which light coming from the useful light source or target and light coming from outside the useful light source is detected.

The invention contemplates the possibility of preferably using two targets as a light source, a highly reflective or white target used as a useful light source for the measurement of atmospheric attenuation and a zero reflection or black target, as mentioned above, used as a measurement of background light in the system for the measurement of atmospheric attenuation. In the systems for measurement of the state of the art based on digital cameras, only a useful light source which is a sunlight reflecting target is used. This may represent a problem because not only does light coming from the target reach the system for measurement, but so does part of the diffuse light reflected by the atmosphere that is on the direct path from the camera to the target and forms background light which is variable with the conditions of the atmosphere and is added to the light coming from the target. The same occurs in the system for measurement object of the present invention, i.e., the light of the target and part of the diffuse light that is in the direct path from the target to the system for measurement is detected, and for this reason, to eliminate the diffuse background light, the system proposes using a dark target that does not reflect any sunlight. Thus, when the system for measurement is aimed at the dark target, only the diffuse light, which is the background light eliminated from the measurement, is measured. In the preferred embodiment of the system, a white target would be arranged as the source, and next to it, preferably under same, a black target. Thereby, to take the measurement, the telescopic optical device would first have to be oriented towards the black target to measure the diffuse background light, and then the telescopic optical device would have to be oriented towards the white target to measure the useful light source by eliminating the measurement of the black target.

As mentioned, taking the measurement of the attenuation in the entire spectral range of the sun, that is, from the ultraviolet to the near infrared range, prevents significant errors which do occur in the state of the art since there is no need to assume the spectral form of the atmospheric attenuation of the infrared from the atmospheric attenuation in the visible range. Measuring power exclusively in the visible spectrum, due to the exclusive use of silicon sensors or digital cameras the sensing elements of which are made of silicon, limit the detection of a spectral range of up to 1050 nm. However, a significant part of the solar radiation is present in the infrared spectrum, i.e., up to about 1600 nm, and the atmospheric attenuation does not have the same weight in the visible range as in the infrared range. By means of measuring throughout the entire solar spectrum, the significant errors in the measurement occurring in the systems of the state of the art are avoided. Thus, the present invention proposes the use of silicon sensors for measuring the spectrum from 300 nm to 1050 nm and indium gallium arsenide (InGaAs) sensors for measuring the spectrum from 900 nm to 2600 nm to thus cover the entire solar spectrum for achieving a more precise measurement. Nevertheless, measuring the spectrum up to 1650 nm is proposed for the preferred embodiment of this invention for technical and financial reasons without losing appreciable accuracy.

Likewise, the system object of the present invention takes a measurement of the optical spectrum of the detected radiation, unlike known systems which take an integrated measurement of the power of the spectrum of the measured radiation, thus avoiding errors in the measurement. These errors are due to the fact that silicon and InGaAs sensors have a strongly wavelength-dependent response. For example, in silicon the response at 600 nm is half that at 800 nm, so if no a measurement of the optical spectrum is not taken, this dependence cannot be discounted. All the systems of the state of the art take a measurement with a sensor or a digital camera, and therefore it is a measurement that integrates the entire spectrum of the measured light, whether it is from an LED (Light Emitting Diode) or a lamp or the sun, in which the spectrum of the source is multiplied with the response of the detector. Therefore, the response of the detector cannot be discounted. If the atmospheric attenuation varies at different wavelengths, as it actually does, in the systems of the state of the art there can be an error in the measurement of the atmospheric attenuation since a variation for example at 800 nm will have twice the weight in the measurement as a variation at 600 nm. To avoid this, there has to be a measurement of the spectrum, which is what the system of the present invention does, such that it allows eliminating the response of silicon and InGaAs for each wavelength, obtaining a more precise measurement of the atmospheric attenuation.

Because of this, i.e., the fact that a measurement of the optical spectrum of the measured light is taken, it is possible to perform a study and diagnostics of the cause of the atmospheric attenuation as it has the measurement of the spectral attenuation of the atmosphere since it is the only way to identify the causes of the attenuation. Furthermore, as a result, the system object of the invention is the only one that can establish correlations between the atmospheric conditions that can be measured with other humidity, particle, pollution type measurement devices, etc., and atmospheric attenuation. Thus enhancing the evaluation of the attenuation phenomenon in solar resource assessments for site selection and prefeasibility studies, as well as for its forecasting in operating plants.

DESCRIPTION OF THE DRAWINGS

The following drawings are attached to the present description and show a preferred embodiment of the invention in an illustrative and non-limiting manner.

PREFERRED EMBODIMENT

As previously mentioned, the present invention relates to a system and method for the measurement of the atmospheric attenuation of electromagnetic radiation, in a differential and precise manner at each wavelength, i.e., in a spectral manner, allowing the characterization of the phenomena causing same, in the space comprised between various points.

Figure 2:
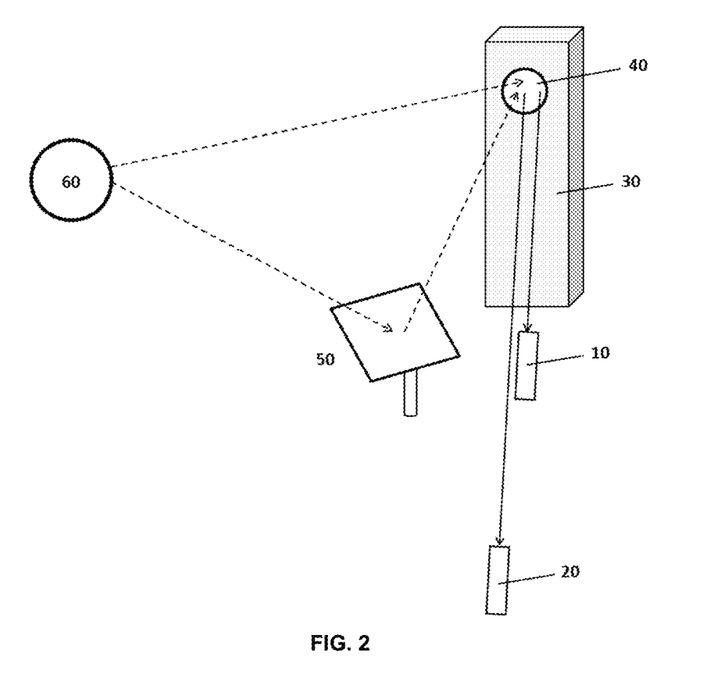
FIG. 2 shows a preferred diagram of an embodiment of the system for the measurement of the attenuation of solar radiation object of the invention.
Figure 3:
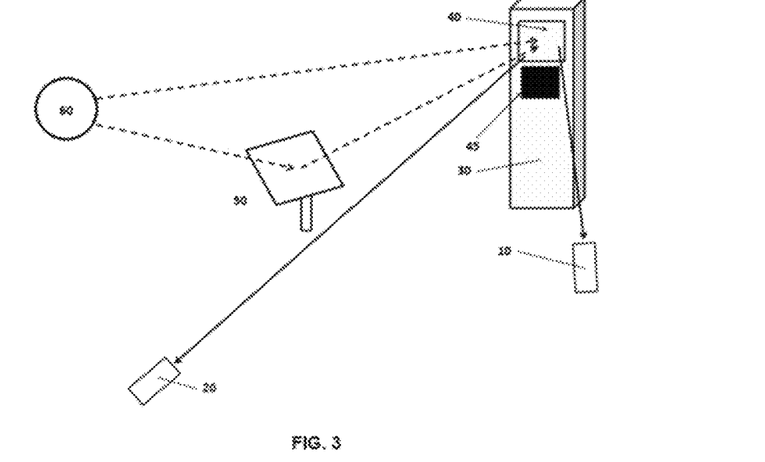
FIG. 3 shows a second preferred diagram of an embodiment of the system for the measurement of the attenuation of solar radiation object of the invention in which an absorbing screen is included.

The proposed system (FIGS. 2 and 3) is preferably made up of a useful source of emission 40 of electromagnetic radiation and at least two devices 10, 20 for capturing the radiation emitted by said source separated from one another and at different distances from the mentioned source 40. The useful source of emission of electromagnetic radiation can be both artificial and natural (the sun as both the direct and the reflected source). The optical devices 10, 20 for capturing electromagnetic radiation must be telescopic and assure the capture of electromagnetic radiation coming from only the mentioned source 40, which is achieved by adapting the angle of acceptance (maximum angle at which the incident light ray is trapped) to the geometric considerations of the system (size of the source and distance between the source 40 and the detecting devices 10, 20). Preferably the useful source will be a screen 40 which reflects the direct sunlight beam from the sun 60 or a light beam previously reflected by at least one heliostat 50. For example, the angle of acceptance ($\alpha$) is 1 mrad, the angle of acceptance ($\alpha$) being, as defined above, the largest angle at which the rays from an object or source strike the detection system and are detected by said detection system.

Figure 4:
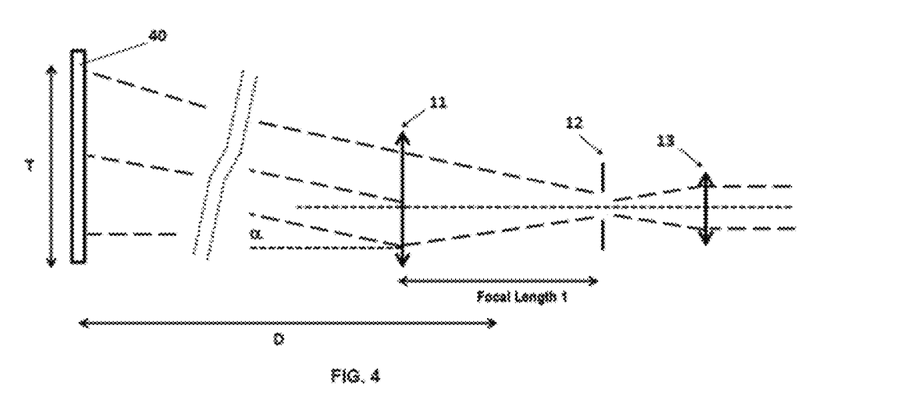
FIG. 4 shows a preferred diagram of a telescopic optical device for capturing a light beam.
Figure 5:
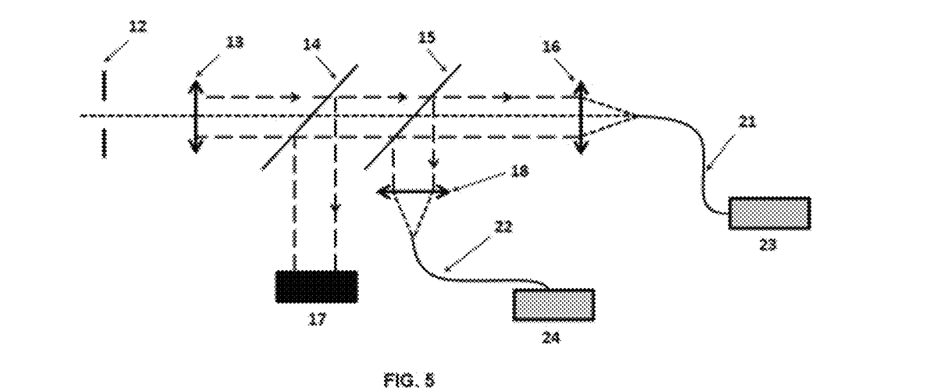
FIG. 5 shows a preferred diagram of the detection and measurement device equipped with splitters.
Figure 6:
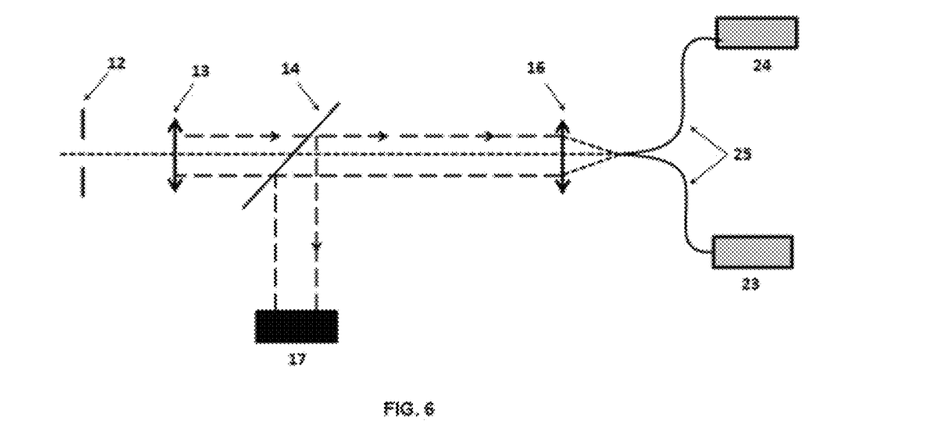
FIG. 6 shows a preferred diagram of the detection and measurement device equipped with multifiber.

The reference telescopic optical device 10 and measurement device 20, each arranged at a different distance D from the source 40, preferably have a telescopic objective 11, followed by a field diaphragm 12 determining the focal length 1 of the device 10, 20, followed by an eyepiece 13 to amplify the signal and form the image (FIG. 4). After the eyepiece 13 either a beam splitter 15 (FIG. 5) or multifibers 25 (FIG. 6) can be used for splitting and directing the captured signal towards each detection and measurement device 23, 24.

Should be pointed out the use of reflecting telescopes (which make use of mirrors instead of lenses for focusing the light and imaging), which prevent the angle of acceptance ($\alpha$) from changing with the wavelengths. The telescopic optical devices 10, could use a refracting type telescope.

Figure 7:
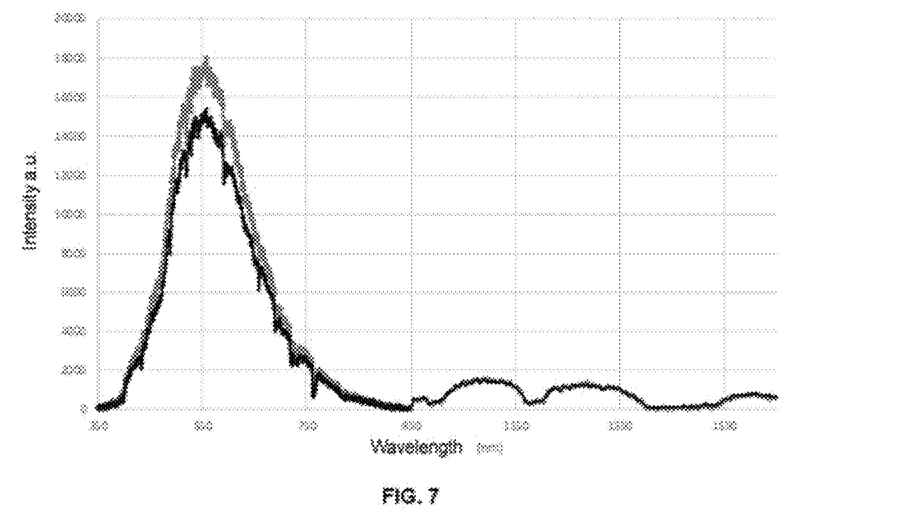
FIG. 7 shows the measurements spectroscopic taken by the reference device and the measurement device for calculating the spectral attenuation (intensity in arbitrary units, a.u., with respect to wavelengths).

The electromagnetic radiation coming from the source 40 captured by the telescopic optical devices 10, 20 will be conducted to at least one real-time detection and measurement device 23, 24 associated with each telescopic optical device 10, 20 (FIGS. 2 to 6), which will provide simultaneous real-time measurements of the spectrum thereof and in a spectral range that is broad enough for the considered application, preferably between 300 nm and 1650 nm (see FIG. 7). The comparison of the spectral curves obtained from the measurements of each detection and measurement device 23, 24 will provide as a result the relative spectral atmospheric attenuation of the electromagnetic radiation considered (see FIG. 8). Performing a prior calibration between both optical devices 10, 20 allows obtaining the absolute measurement of spectral attenuation.

According to a preferred embodiment (FIG. 2), and as discussed, as a source of emission of electromagnetic radiation the invention proposes the actual sunlight 60 reflected in a hemispherical manner by a light diffusing white screen 40 located at the maximum height at which the measurement of the attenuation will be taken along with a telescopic optical light device 10 close to the source and acting as a reference measurement of the light signal located at the level of the ground and to a telescopic optical device 20 located farther away from the source and acting as a measurement of the attenuated light signal by the atmosphere also located at the level of the ground. Additionally, the energy reflected by said screen 40 can be increased, causing solar energy reflected by one or more heliostats 50 to strike it. According to said preferred embodiment, the screen 40 is located at the height of the receiver of a concentrating central receiver (or tower 30) solar power plant, and the telescopic optical devices 10, associated with their detection and measurement devices 23, 24 for detecting and measuring the attenuated light signal are located at two distances with respect to the central receiver in the solar field, for example at 300 meters (reference device 10) and 1600 meters (measurement device 20) from the source 40. These distances can vary depending on the size of the solar field or other conditioning factors.

Using the sun 60 as a light source simplifies the optical system and assures a spectral distribution and range suitable for modeling the attenuation phenomenon at the actual site (or any other site), for purposes of both prediction and resource estimation in the absence of recorded data.

It should be pointed out that the preferably circular or rectangular screen 40, though other geometric shapes are possible, must possess hemispherical reflectance to avoid the presence of privileged directions in reflection and thereby having a spatially uniform source. Likewise, this screen 40 must have a large enough size to assure that the telescopic optical device 20 of the attenuated light signal, the one farthest away, only captures light coming from the screen 40 and thereby avoid variable background signals which would entail uncertainties in the measurement. The size of the screen (T) must be related to the angle of acceptance ($\alpha$) or inlet aperture of the optical system for the measurement 20 of the light signal and the distance (D) existing between said system 20 and the screen 40, according to the following equation:

$$T \geq D * \tan(\alpha)$$

Specifically, for a distance of 1600 m and an aperture of 1 mrad, the size of the source has to be larger than a circle having a diameter of about 1.6 meters. The value of the inlet aperture of the optical system for the measurement of the light signal is determined by the focal length of the objective 11 and the field diaphragm 12. The preferred embodiment proposes that once the light signal is captured by the reference optical device 10 and by the optical measurement device 20 for measuring the attenuated light signal, they are transmitted by optical means, preferably optical fiber 21, 22 to a photodiode array spectrometer 23, 24 for the real-time measurement of the spectrum thereof simultaneously by both telescopic devices 10, 20.

To cover a sufficient spectral range in the case of sunlight, said preferred embodiment proposes the use as detection and measurement devices 23, 24 of two photodiode array spectrometers: one preferably being a silicon detector array 23 in the range of 300 nm to 1050 nm, and the other one preferably being an InGaAs detector array 24 in the range of 900 nm to 1650 nm. To enable the real-time measurement of both spectral ranges, the beam captured by each telescopic optical device 10, 20 must be split, preferably with a beam splitter 15, thought it is also possible by multifibers 25, and be focused on the optical means 23, 24, preferably the optical fiber 21, 22, 25, by means of focusing lenses 16, 18.

Furthermore, a system is needed which allows aligning telescopic systems with the screen, said system including both optical and mechanical components. This alignment requires splitting 14 the beam, before that described, to enable displaying the captured image in a digital camera 17 (preferably CCD). In a preferred embodiment, it is proposed that the telescopic systems 10, 20 are aligned towards the screen manually.

The described diagrams of both the telescopic optical device 10, 20 and the detection and measurement device 23, 24 together form the reference system and the system for the measurement of the attenuated light signal. Each of said devices provides a measurement of the spectral curve of the sunlight reflected by the screen in the range of 300 nm to 1650 nm, with a spectral width resolution of 0.5 nm, for example.

As mentioned, a possible measurement device 23, 24 is made up of the photodiode array spectrometers in which the sensors are clustered in an array, or monochromators which, from the refraction or scattering phenomenon, spatially separate the different wavelengths present in the signal. The system will thereby provide measurements of the light signal for each wavelength of the specified spectral range, that is, spectral curves of the intensity of the light signal (FIG. 7).

By the direct comparison of said curves, monochromatic atmospheric attenuation (FIG. 8) is obtained for each wavelength between 300 nm and 1650 nm with the spectral resolution of 0.5 nm of the electromagnetic radiation considered from the screen to the system for measurement. The set of all the monochromatic attenuations provide the values of the curve of the spectral attenuation of the electromagnetic radiation considered between 300 nm and 1650 nm. The values of the curve of said spectral attenuation, weighted with the spectrum of the electromagnetic radiation, provide the value of the global attenuation in the range of 300 nm to 1650 nm.

For obtaining an absolute measurement, the prior calibration between the measurements obtained by the reference system and the system for measurement must be assured, and the difference of distance traveled between the reference systems and the screen must be considered.

It should be pointed out that both the reference and the measurement signals can be contaminated by the light scattered by the atmospheric components present between the screen and the telescopic systems (for example, aerosols), defined as background light.

To characterize said background light, in another preferred embodiment (FIG. 3), the system object of the invention contemplates that the telescopic optical devices can be aligned towards an absorbing screen 45, i.e., it has a very low reflectivity (as close as possible to 0%), and particularly, much lower than that of the screen with hemispherical reflectance 40 described above (with a reflectively as close to 100% as possible) and used to provide reflected radiation to the telescopic optical devices. Therefore, the signal measured by the telescopic systems aligned towards the absorbing screen 45 can be taken into account to quantify and model the attenuation phenomenon.

Figure 8:
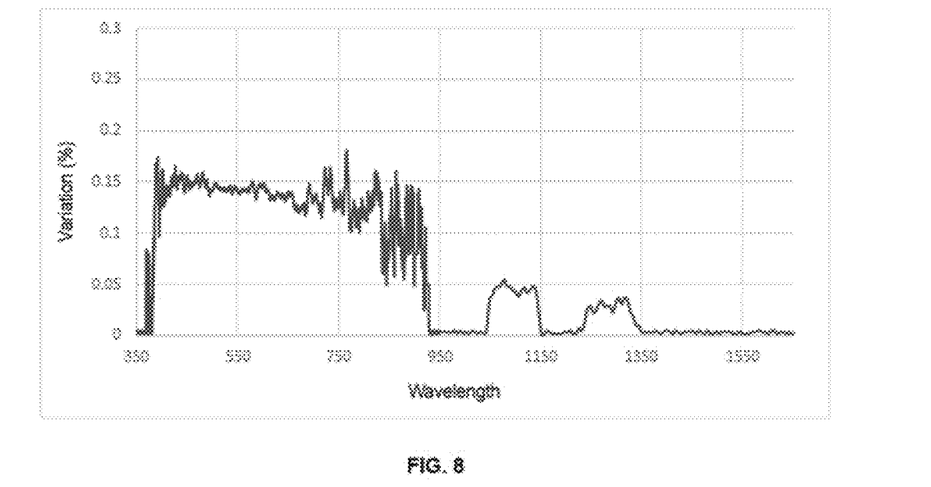
FIG. 8 shows the variation between the two preceding measurements resulting in the existing spectral attenuation (variation in % with respect to wavelengths).

The operating method of the preceding systems has the following steps:
- aligning at least two telescopic optical devices 10, 20, located at different distances from the source 40, towards the source of electromagnetic radiation 40,
- capturing a beam of electromagnetic radiation reflected in the source by means of each of the telescopic optical devices 10, 20,
- detecting and taking monochromatic measurements in the various spectral regions covered by the detection and measurement devices 23, 24 for detecting and measuring the captured radiation (FIG. 7), and
- calculating atmospheric attenuation in real-time by comparing the monochromatic spectral measurements (FIG. 8).

The method preferably comprises a prior step before aligning the devices 10, 20 towards the source of electromagnetic radiation, in which the devices 10, 20 are aligned with an absorbing screen (FIG. 3) to measure the background light and subsequently consider the excluding the background light from the measurement.

Likewise, after the calculation of the atmospheric attenuation the method comprises a step of applying spectral analysis and spectroscopic techniques to identify and discern the phenomena causing the previously calculated atmospheric attenuation. Preferably also, before aligning the telescopic optical devices 10, 20, a calibration process is performed for the detection and measurement devices 23, 24 by locating the telescopic optical devices 10, 20 at the same distance from the source 40 of electromagnetic radiation.

The invention claimed is:

1. A system for real-time spectral width resolution measurement of atmospheric attenuation spectrum of electromagnetic radiation, comprising:
   - at least one electromagnetic radiation source,
   - at least two reflective telescopes configured to capture a beam of radiation from only said electromagnetic radiation source and that are located at different distances from said source, each reflective telescope comprising a diaphragm between a telescopic objective and an eyepiece of the reflective telescope to limit an angle of acceptance of the reflective telescope and avoid capturing light that comes from outside the electromagnetic radiation source of the system,
   - at least one system for optical alignment of each reflective telescope with the electromagnetic radiation source,
   - at least one photodiode array spectrometer as real time detection and measurement device, optically connected to each of the reflective telescopes to provide measurements of the radiation in a solar spectral range between 300 nm and 1650 nm,
   - splitting means for splitting the beam of radiation after each eyepiece to take one part of the beam to the at least one array spectrometer and another part of the beam to the system for optical alignment of each reflective telescope with the electromagnetic radiation source, and
   - at least one processor for the communication between the spectrometers; for analyzing the measurements from signals detected by the spectrometers; as well as for inferring solar energy attenuation in the distance between the reflective telescopes through the difference, in real-time, of spectral energy that strikes in said reflective telescopes; and for calculating, in said distance between the reflective telescopes:
     a monochromatic atmospheric attenuation for each wavelength of the spectrum, a relative spectral atmospheric attenuation, by comparing spectral curves obtained from the measurements of each detection and measurement device, an absolute spectral atmospheric attenuation, and a global attenuation from this attenuation spectrum, such that the global attenuation is calculated by integrating the relative spectral attenuation or the absolute spectral attenuation in a spectral range between 300 nm and 1650 nm of measurement weighted with a solar spectrum.

2. The system according to claim 1, wherein the beam captured by each reflective telescope is split by the splitting means into as many beams as there are detection and measurement devices connected to the reflective telescope, said beams being guided to and focused on said detection and measurement devices, each detection and measurement device covering a different region of the spectral range to be measured.

3. The system according to claim 2, wherein the beam is split by optical beam splitters.

4. The system according to claim 2, wherein the beam is split by multifibers.

5. The system according to claim 1, wherein the detection and measurement devices are monochromators.

6. The system according to claim 1, wherein the system for alignment comprises a digital camera to enable displaying a captured image of the source.

7. The system according to claim 1, comprising, a reflective screen as a source which reflects sunlight towards the reflective telescopes.

8. The system according to claim 7, comprising an absorbing screen, located close to the reflective screen, for excluding background light from the measurement.

9. The system according to claim 7, comprising an heliostat that reflects the sunlight to the reflective screen and this one towards the reflective telescopes.

10. The system according to claim 1, wherein the reflective telescope comprises an angle of acceptance equal to or less than the angle subtended by the source on said device.

* * * * *